United States Patent [19]

Osborn et al.

[11] 4,307,630
[45] Dec. 29, 1981

[54] GEARING

[76] Inventors: Merritt A. Osborn, 8706 Cedar Rd., Chesterland, Ohio 44026; Frank S. Dobric, 1159 Carver Rd., Cleveland Heights, Ohio 44112

[21] Appl. No.: 85,004

[22] Filed: Oct. 15, 1979

[51] Int. Cl.³ .......................... F16H 1/28; F16C 1/24
[52] U.S. Cl. ........................................ 74/805; 308/36.1
[58] Field of Search ................. 74/804, 805; 308/36.1, 308/187.1, 187.2; 277/152, 153

[56] References Cited

U.S. PATENT DOCUMENTS

| 2,635,931 | 4/1953 | May | 308/36.1 |
| 3,013,447 | 12/1961 | Hils et al. | 74/805 |
| 3,320,828 | 5/1967 | Grant | 74/804 |
| 3,726,158 | 4/1973 | Brown | 74/804 |
| 3,955,445 | 5/1976 | Osterwalder | 74/805 |

FOREIGN PATENT DOCUMENTS

| 727755 | 4/1932 | France | 74/804 |
| 167164 | 5/1959 | Sweden | 74/805 |
| 261073 | 11/1970 | U.S.S.R. | 74/804 |

Primary Examiner—Lawrence J. Staab
Attorney, Agent, or Firm—William N. Hogg

[57] ABSTRACT

Improved epicyclic gearing is disclosed. The epicyclic gearing includes first and second gear sets. Each set includes at least one rotatable gear, which rotatable gears are adjacent each other. Rigid plate means are provided which secure the adjacent rotatable gears together and maintains them on essentially parallel planes. Also disclosed is an improved bearing-seal assembly which provides maximum support to a shaft in a minimum length, which provides effective sealing.

13 Claims, 7 Drawing Figures

GEARING

BACKGROUND OF THE INVENTION

This invention relates to speed reducers and more particularly to gear-like speed reducers employing epicyclic gear sets.

Heretofore, speed reducers have taken many different forms such as harmonic, cycloidal or helical type reducers which employ meshing or engaging gear teeth in various configurations. Also, an epicyclic type speed reducer has been developed which employs epicyclic gear sets for speed reduction and torque augmentation. An example of such an epicyclic type speed reducer is shown and described in Adams et al U.S. Pat. No. 3,861,242. Such a reducer has been found to have several advantages over known prior harmonic, cycloidal, and helical type speed reducers. The speed reducer of the present invention is more rugged, has more power carrying capacity, uses a single counter-weight, is of simpler construction, safer to operate, easier to install and maintain, can operate without lubrication immersion, is highly efficient, and is capable of high reduction ratios.

OBJECTS OF THE INVENTION

A principal object of the present invention is to provide an improved epicyclic type speed reducer which still embodies all of the above noted advantages of reducers.

Another object of the invention is to provide such a speed reducer having improved wear and dynamic characteristics resulting in longer life and less frequent maintenance work.

Another object is to provide torque limiting means, to prevent deleterious overloading of the reducer and/or its driving motor.

Yet another object of the invention is to provide such a speed reducer of high efficiency and compact design.

Still another object is to provide a rigid connection between the externally toothed gears of a pair of speed reducing gear sets to maintain the gears on parallel planes and thereby resist skew.

Another object of the present invention is to provide a speed reducer that can operate effectively and safely in certain environments without a housing.

Still a further object of the present invention is to provide a speed reducer which may be easily and rapidly assembled and disassembled for examination, interchange of parts to vary reduction ratios, and replacement of worn parts.

SUMMARY OF THE INVENTION

The foregoing and other objects of the present invention may be obtained by a speed reducer comprising input and output shafts and a pair of axially spaced, epicyclic, differential gear sets. Each gear set includes a gear adjacently disposed a gear in the opposite gear set which gears are mounted for rotation. Means are provided to rigidly couple the adjacent rotatable gears to each other on essentially parallel planes. This will maintain the two gears as a unit and prevent skewing of the gears as well as compensate for manufacturing tolerances.

In addition, the invention contemplates an improved bearing and shaft seal device. The device includes a pair of anti-friction bearing members held in axially spaced relationship, which journal a shaft for rotation and which is maintained in a housing. A seal is disposed between the anti-friction members sealingly engaging the shaft and the spacer member.

DESCRIPTION OF THE PREFERRED EMBODIMENT

Figure 1:
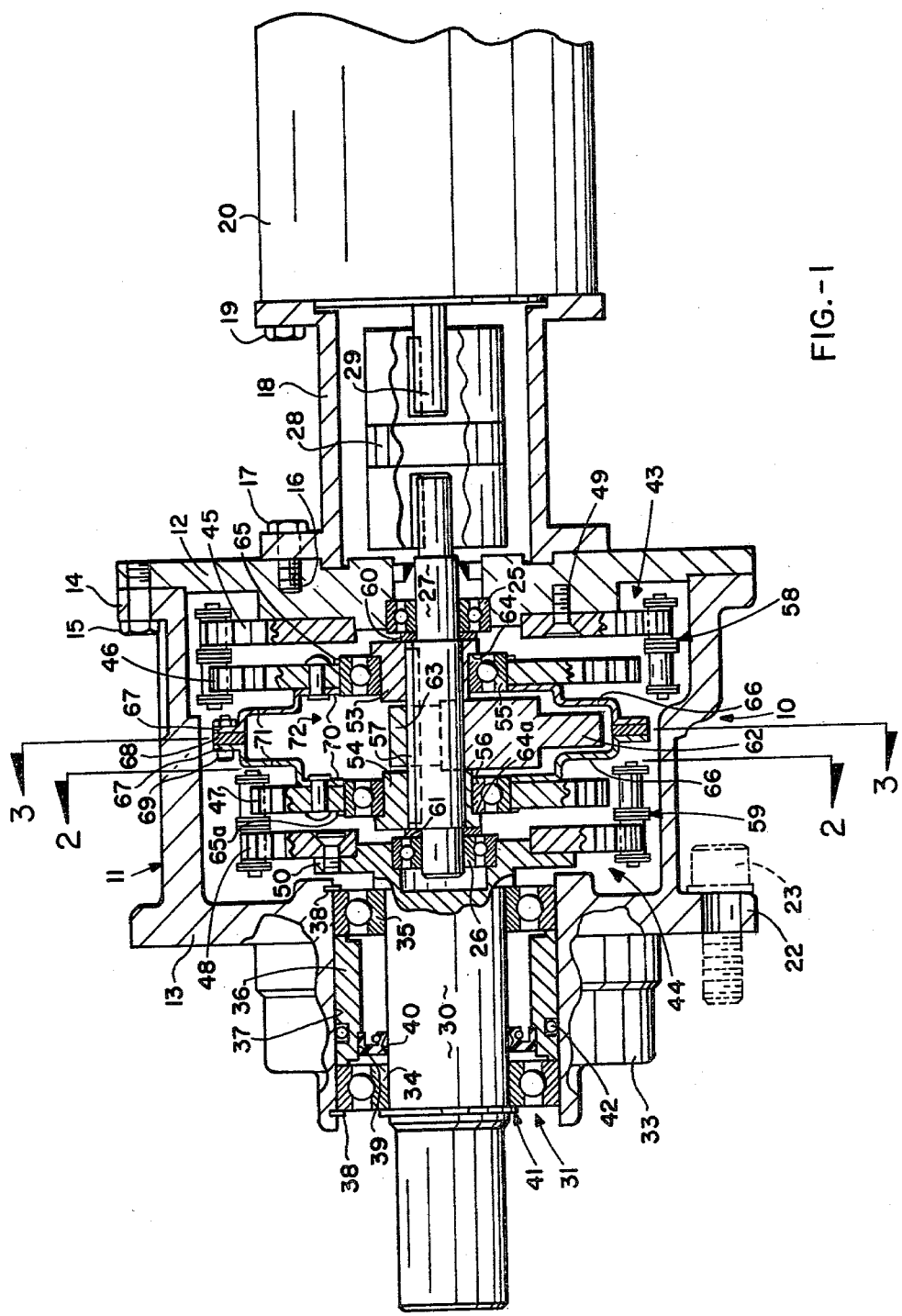
FIG. 1 is a longitudinal sectional view of a preferred embodiment of speed reducer according to my invention.

Referring now to the drawings, a speed reduction assembly according to the present invention is shown and designated generally by reference numeral 10 in FIG. 1. The assembly 10 includes a housing 11 comprising a rearwardly disposed base plate 12, and bell-shaped forward cover portion 13. The housing 11 is fastened at annular flange 14 to the base plate 12 by fasteners 15. The base plate 12 preferably is provided with tapped holes 16 for mounting the assembly 10 by threaded fasteners 17 to an annular adapter 18 which in turn is attached by fasteners 19 to motor 20.

The forward housing cover portion 13 also has an annular outboard flange 22 for mounting, by fasteners 23, of the speed reduction assembly 10 along with motor 20 to a machine (not shown) to be driven thereby.

Journaled in the housing 11 by spaced bearings 25 and 26 is an input shaft 27. The shaft 27 is shown coupled by coupling 28 of adapter 18 to output shaft 29 of the motor 20. The bearing 25 is press-fitted into the base plate 12 while bearing 26 is press-fitted into a bore provided in the inner end of axially aligned output shaft 30. The output shaft 30 in turn is journaled by the improved outboard bearing and seal assembly 31 located in an axial projection 33 of forward housing cover 13.

The bearing and seal assembly 31 shown at the left in FIG. 1 includes outer and inner anti-friction ball bearings 34 and 35, respectively, which are maintained in spaced relationship by a cylindrical spacer 36. The bearings 34 and 35 and spacer 36 are retained in assembled relationship in bore 37 of axial projection 33 by snap rings 38 at opposite ends of the assembly 31. Also, snap ring 38a on shaft 30 retains the bearing and seal assembly on the shaft and bears thrust load as will be explained presently. The bearing assembly 31 also includes a spring-loaded seal 40 which is press-fitted in bore 39 of the cylindrical spacer 36 intermediate the spaced bearings 34 and 35. The seal 40 effectively seals the housing 11 at opening 41 therein against foreign material entering same and retains lubricating fluid in the housing 11. An "o" ring 42 seals the spacer 36 in the bore 37. It will be appreciated that while the seal 40 protects the interior of the housing against damage by foreign matter, the outer bearing 34 which is permanently self-sealed and lubricated protects the seal 40 against damage by foreign matter. Accordingly, seal life is extended. Further, by placing the seal 40 intermediate the inner and outer bearings 34 and 35, the latter can be spaced apart further without adding appreciably to the over-all axial length of the assembly 10. It will be appreciated that the load carrying capacity of the assembly is enhanced by maximizing the spacing between the bearings 34 and 35. Also, it will be appreciated that by placing the seal 40 between the bearings 34 and 35 the space therebetween is not "wasted" and additional length is not required for sealing.

It will also be appreciated that by the placement of the snap rings 38 and 38a any thrust load will be equally born by both bearings 34 and 35, thereby doubling the thrust load that either could carry if each had to carry the whole load.

To achieve speed reduction and increased torque from the gearing of assembly 10, the input shaft 27 and output shaft 30 are coupled together by means of epicyclic gear sets designated generally as 43 and 44. The operation of the epicyclic gearing is similar to that as described in Osborn et al U.S. Pat. No. 3,975,969 or Kurtz U.S. Pat. No. 3,151,495.

Figure 2:
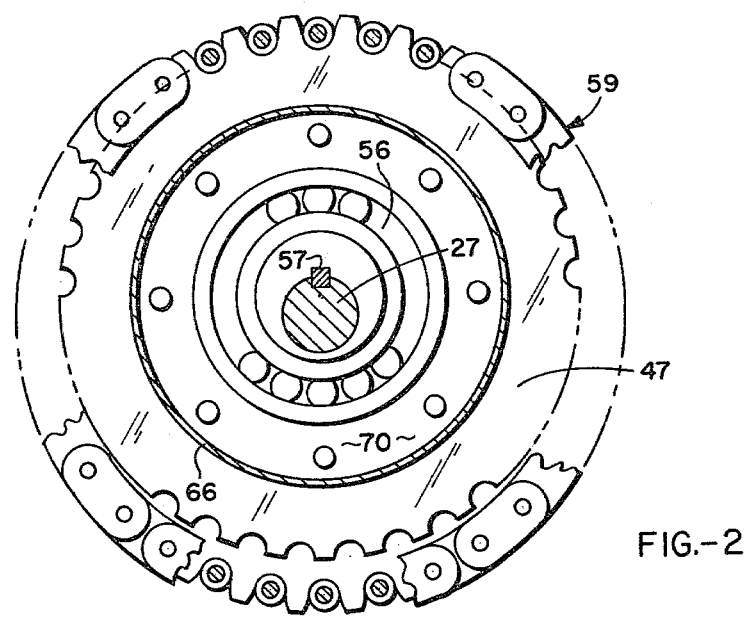
FIG. 2 is a transverse sectional view of the speed reducer taken substantially along the plane designated by the line 2—2 of FIG. 1.
Figure 3:
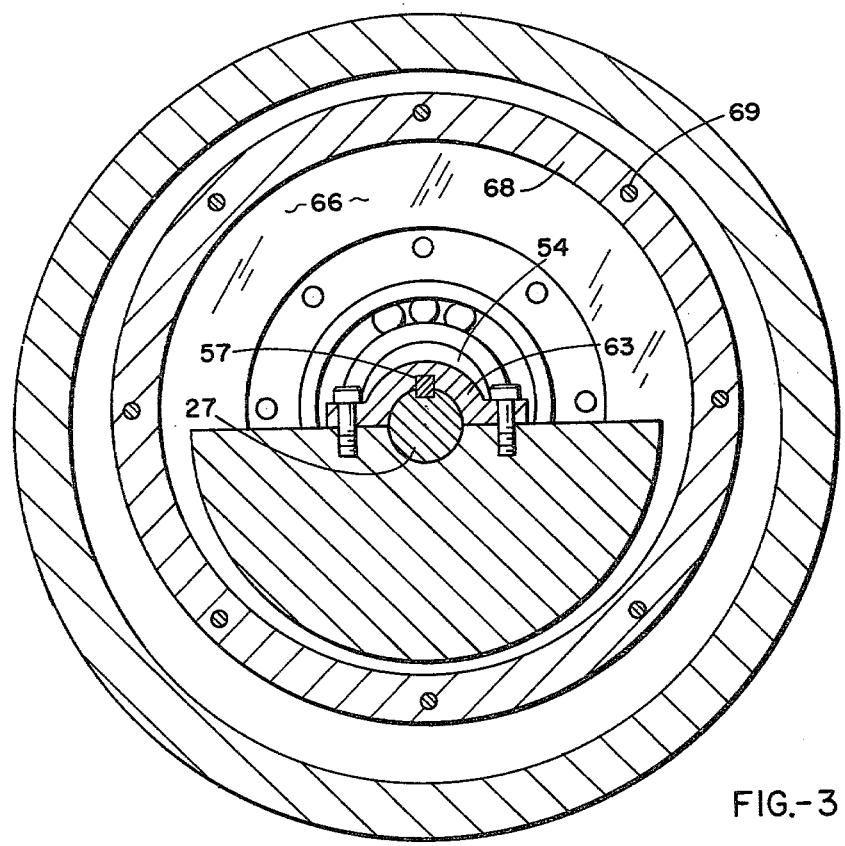
FIG. 3 is a transverse sectional view of the speed reducer taken substantially along the plane designated by the line 3—3 of FIG. 1.
Figure 4:
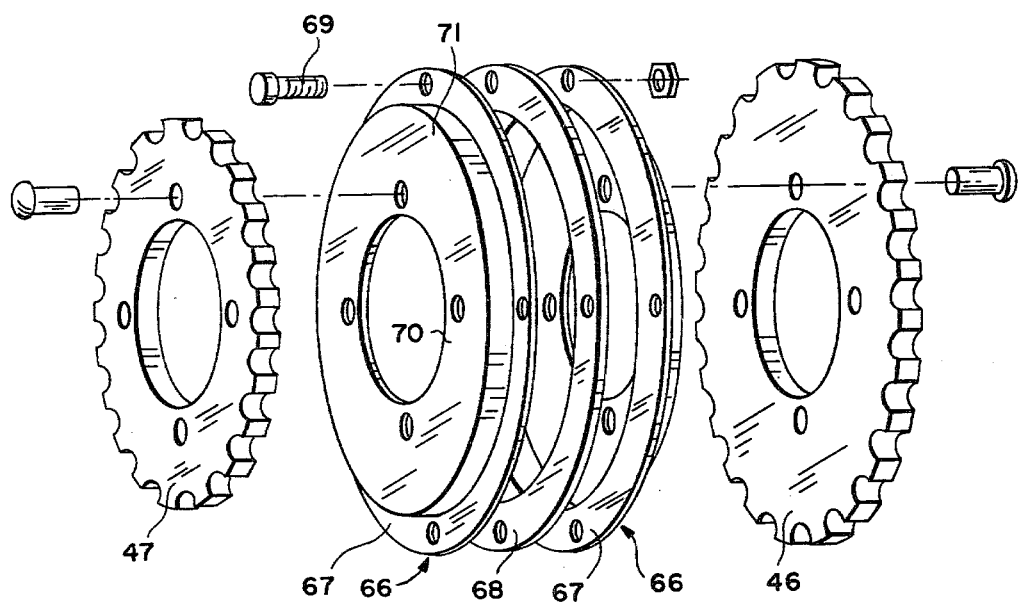
FIG. 4 is an exploded perspective view of the rigid plates connecting the gears.

The gear set 43 includes a pair of gears or sprocket members 45 and 46, and the gear set 44 includes a pair of gears or sprocket members 47 and 48. The gear member 45 is secured to an annular mounting flange 50 on shaft 30 by fasteners 51. The mounting flange 50 is journaled for rotation on shaft 27 by anti-friction bearing 26. Gear members 46 and 47 are journaled on eccentrics 53 and 54 respectively by bearings 55 and 56 respectively. The eccentrics, in turn, are keyed to shaft 27 by keys 57 (FIGS. 2 and 3).

An endless double strand sprocket drive chain 58 is reaved around the gear members 45 and 46 and a second endless double strand sprocket drive chain 59 is reaved around gear members 47 and 58. These drive chains act as drive members for gear sets 43 and 44. The eccentrics 53 and 54 are preferably spaced from their respective adjacent shaft bearings 25 and 26 by shims 60 and 61 to assure unrestricted rotation. Also, the eccentrics 53 and 54 are axially spaced to allow for the mounting of a counter-weight 62 therebetween, which as best seen in FIG. 3 includes a semi-circular mass of counter-weight material. The counter-weight 62 is secured to the input shaft 27 by yoke-type clamp 63 with the throw of the counter-weight extending opposite the throw of the eccentrics 53 and 54 to counter-balance the same. In addition, the counterweight assembly 62 is keyed for rotation with the input shaft by key 57. By providing a single central counterweight assembly, precise counterbalancing of the speed reducer is obtained. Heretofore, a pair of counterweights were located axially outwardly of the eccentric masses and with such, proper weighing and alignment of the same for precise counterbalancing of the speed reducer was difficult to obtain and/or maintain.

The eccentrics 53 and 54 on their outer radial surfaces are each provided with shoulders or registers 64 and 64a respectively which locate the gear bearings 55 and 56 axially. Each gear bearing 55 and 56 at its outer radial surface, in turn, is provided with annular grooves in which are received snap-rings 65 and 65a respectively. The snap-rings 65 and 65a form a register which properly locate gears 46 and 47 axially.

In accordance with the present invention, the gears 46 and 47 are maintained axially spaced against their respective shoulders 64 and 64a in assembled relationship by a pair of rigid, essentially non-flexible, circular, annular dished plates 66 which are joined together at their other peripheral flanges 67 on opposite sides of yieldable ring 68 by means of fasteners 69. The plates 66 have aligned central apertures formed by inner connecting flanges 70 providing aligned inner peripheries whereat the same are attached to the radially inward portions of the sprocket gears 46 and 47 respectively.

The dished plates 66 are preferably stepped radially outwardly and axially inwardly toward one another and are formed with radially extending inner and outer connecting flanges 67 and 70, respectively, at their radially inner and outer peripheries. Axially extending intermediate portions 71 add axial rigidity to the plates 66 to ensure parallelism between the internal gears 46 and 47 when subjected to differential forces arising during operation of the reducer assembly 10; i.e. the rigid plates 66 maintain the gears 46 and 47 on essentially parallel planes during operation to prevent skewing between the gears.

The inner connecting flange 70 of each plate 66 may be integrally connected to its respective internal gear by rivets while each outer connecting flange 67 may be joined to the other by removable fasteners 69. Preferably, each outer connecting flange 67 extends radially outwardly beyond the radially outermost extent of at least one gear of each set whereby the fasteners 69 are readily accessible for disassembly of the plates, and thus provide access to the gear sets. Also, the resilient ring 70 at the outer periphery of the plates 66 compensate for slight misalignment due to manufacturing tolerances and assembly operations.

With the foregoing construction, it will be seen that dished plates 66 form an interior space 72 in which the counter-weight 62 is freely rotatable. Such space is of particular importance when the speed reducer is employed without an external housing 11 as may be desired in some applications. For example, the plates 66 preclude insertion of an element which may damage the counter-weight 59 or jam the speed reduction assembly 10. Moreover, the same precludes insertion of fingers or the like which may be injured by the rotating counter-weight 62.

The annular ring 68 is provided to prevent distortion of the rims of the plate 66 and torque of fasteners 69.

As indicated above, the dished plates 66 provide the driving connection between the internal gears 46 and 47 of the gear sets 43 and 44 respectively. Each external gear is in driving engagement with its corresponding internal gear 45 as the input shaft 27 is rotated. Because the internal gear 45 of gear set 43 is restrained against rotation relative to the input shaft 27, a differential action on the internal gears is effected for driving the internal gear of gear set 44 connected to the output shaft 30 in a direction opposite the input shaft.

The operation of this type of reduction gearing is briefly as follows.

To obtain a desired speed reduction, the number of teeth on the gear 46 must be less than the number of teeth on gear 45 and the number of teeth on gear 47 must be less than the number of teeth on gear 48. It has been found that the difference in the number of teeth between the gears of each gear set must be the same. The amount of reduction obtained will depend upon this difference in the number of teeth between the gears of each gear set; the lower the difference the greater the reduction, with the maximum reduction being obtained with a one tooth differential. Such reduction ratio can be readily calculated by using the equation:

$$DB/B - C = A - B(x)$$

wherein x is the reduction ratio and letters A, B, C and D are the number of teeth of the gears 45, 46, 47 and 48 respectively.

In operation, rotation of the input shaft 27 will eccentrically displace the internal gear 46 of the rightward gear set 43 causing the gear 46 to climb on chain 58 around the interior of the gear 45 of rightward gear set 43. As the gear 46 so climbs, the same will be caused to rotate at a substantially reduced speed depending upon the tooth differential. The gear 46 of gear set 43 being connected by plates 66 to gear 47 will drive the gear 47 of the other or leftward gear set 44 while the same is being eccentrically displaced by the rotating input shaft 27 causing the same to climb around gear 48. Because the gear 48 of gear set 44 is free to rotate, the same will be rotatably driven by the mating internal gear through the chain 59 but at a reduced speed. Such rate of rotation of the output shaft will be at a lesser rate than that of the gear 46 of gear set 44 resulting in a second speed reduction.

Because the tangential forces acting on the internal gears 46 and 47 of the gears are in opposite directions, differential forces are created which tend to distort the components destroying the pitch line contact of the gear teeth causing uneven wear and rubbing. In the present design, the dished plates 66 hold the gears 46 and 47 parallel to each other and substantially perpendicular to the axis of the input and output shafts to properly locate the pitch line of these gear teeth and eliminate destruction thereof.

With the foregoing construction, it will be appreciated that the reduction assembly 10 may be readily disassembled and assembled for purposes of replacing worn parts or for changing the gears to vary the reduction ratios by replacement with a minimum of parts. By removing the fasteners securing the cover to the base plate, the base plate carrying the various gears can be readily removed from the cover by moving the same axially. With the cover removed, the fasteners securing together the dished plates may be removed thereby enabling separation of the gear sets from each other and their removal from the input shaft. With the reducer disassembled as described, the sprockets may be readily interchanged to provide the desired reduction ratio and then the reducer reassembled and installed.

Figure 5:
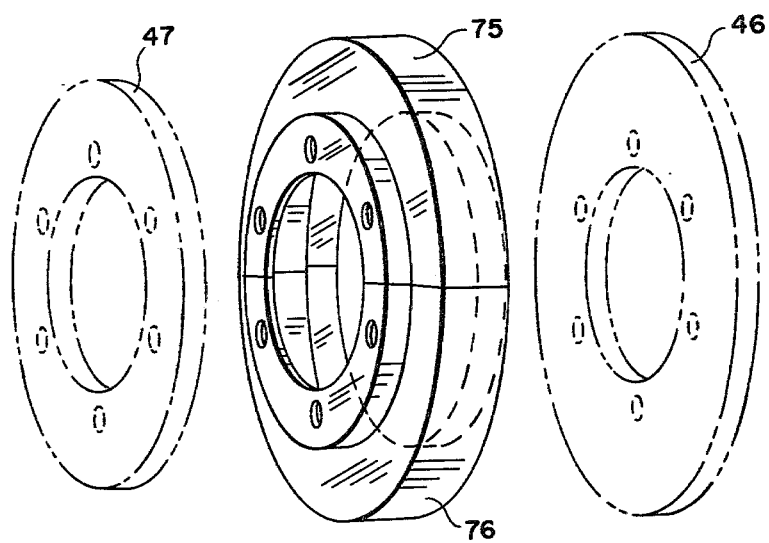
FIG. 5 is a perspective view similar to FIG. 4 of another embodiment of the rigid plates.

Another embodiment of a rigid plate structure is shown in FIG. 5. In this embodiment, two plate sections 75 and 76 are provided which mate traversely along plane 77 rather than longitudinally, and form a space therebetween for the counter-weight. In this case each plate section 75 and 76 is secured to both ears 46 and 47 by fasteners (not shown).

Figure 6:
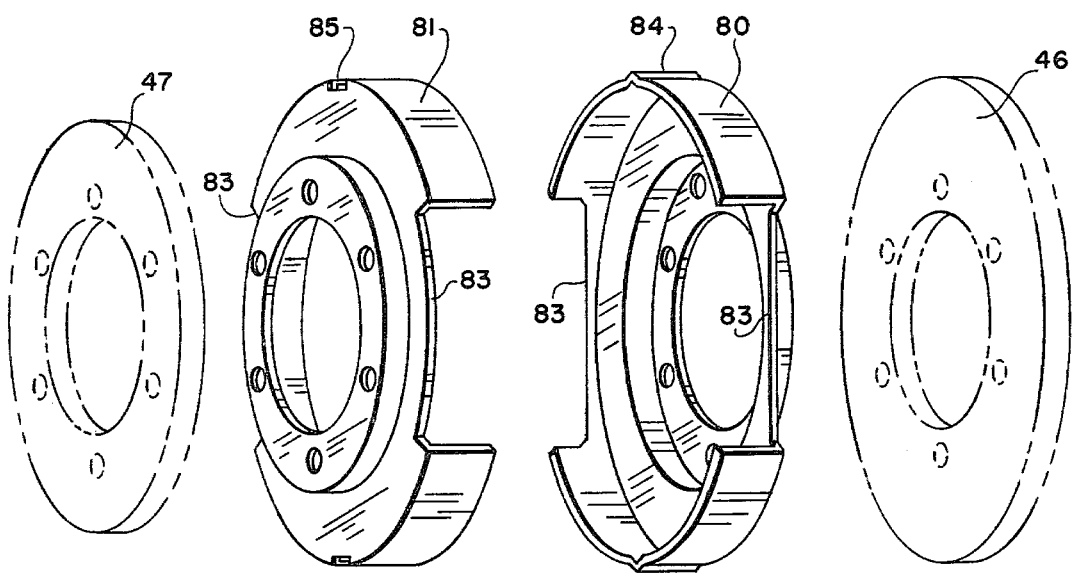
FIG. 6 is a perspective exploded view of yet another embodiment of rigid plates.
Figure 7:
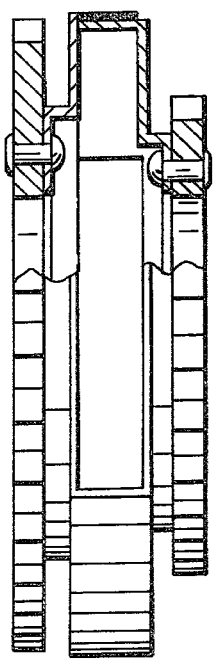
FIG. 7 is an elevational view, partially in section of the plates of FIG. 6 in assembled relationship.

Still another embodiment of rigid plates is shown in FIGS. 6 and 7. In this embodiment, a pair of plates 80 and 81 are provided which attach respectively to gears 46 and 47. Each plate has two cut out sections 83 which reduce their weight and still maintain rigidity. The outer peripheries are keyed together by key 84 formed on plate 80 mating with keyway 85 on the other plate 81.

We claim:

1. In speed reduction gearing means comprising first and second axially spaced, epicyclic differential gear sets, each gear set including adjacently disposed rotatable gears, the improvement comprising means for coupling said rotatable gear of each gear set to said rotatable gears of the other for transmission of torque, said means for coupling including means to rigidly secure said rotatable gears on essentially parallel planes, said last named means including first and second annular dished plates each plate having a central aperture and being secured adjacent its inner periphery to a radially inward portion of its one of said adjacent rotating gears, and fastener means connecting said plates together at their outer peripheries at a location radially spaced from the connection of the inner periphery, whereby to provide a rigid unitary structure, whereby to prevent skewing of the rotating gears with respect to each other during rotation.

2. The invention as defined in claim 1 wherein said plates each have wedge shaped openings formed therein whereby to reduce the amount of material required.

3. The invention as defined in claim 1 wherein said means connecting said plates comprises a plurality of removable fasteners and said outer peripheries of said plates extend radially beyond at least said rotating gears thereby making said fasteners readily accessible.

4. The invention of claim 1 wherein said rotating gears are mounted on an input shaft and a counter-weight is mounted on said input shaft disposed between said adjacent rotating gears and housed for free rotation within said connected plates.

5. The invention as defined in claim 1 further comprising an annular ring secured between the outer peripheral margins of said plates providing means to prevent distortion of said edge of said plate when under torque.

6. The invention as defined in claim 5 wherein the rotatable gear of each set is mounted on rotating shaft means and positioned thereon by retainer ring means carried by said shaft means.

7. The invention as defined in claim 1 wherein said gearing means includes input and output shafts and a housing in which the gear sets are disposed together with lubricant therefore, an improved seal and bearing device journalling at least one shaft on said housing, said improved seal and bearing device comprising first and second anti-friction bearing members, spacer means interconnecting said first and second anti-friction bearing member in axial spaced relationship, means to sealingly mount said spacer means in said housing with said anti-friction bearing members journalling said one shaft for rotation, and seal means interposed axially between said anti-friction bearing members sealingly engaging said one shaft and said spacer means, to thereby prevent entry of contaminants and the escape of lubricants, and said anti-friction bearing most remote from the housing being self sealed and lubricated.

8. The invention as defined in claim 1 wherein each of said plates has a stepped configuration including at least one section extending transverse to the axis of rotation of the gears, whereby to increase the rigidity of the coupling means.

9. In speed reduction gearing having input and output shafts and a housing in which is disposed the gear members and lubricant therefore, an improved seal and bearing device journaling at least one of said shafts on said housing, said improved seal and bearing device comprising, first and second anti-friction bearing members, spacer means interconnecting said first and second anti-friction bearing members in axial spaced relationship, means to sealingly mount said spacer means in said housing with said anti-friction bearing members journaling said one shaft for rotation, and seal means interposed axially between said anti-friction bearing members sealing engaging said one shaft and said spacer means to prevent entry contaminants and escape of lubricant and said anti-friction bearing most remote from the housing being self sealed and lubricated.

10. The invention as defined in claim 9 wherein said seal means includes an annular seal member in sliding contact with said one shaft, and ring means carried by said seal member urging said seal member into contact with said one shaft.

11. The invention as defined in claim 9 further characterized by means to divide the axial load between said first and second anti-friction bearing members.

12. The invention as defined in claim 11 wherein said means to divide the load includes snap ring means.

13. The invention as defined in claim 9 wherein seal means are interposed between said spacer means and said housing to prevent escape of lubricants and entry of contaminants.

* * * * *